United States Patent
Katayama et al.

(10) Patent No.: US 7,444,117 B2
(45) Date of Patent: Oct. 28, 2008

(54) WIRELESS NETWORK SYSTEM AND COMMUNICATIONS METHOD

(75) Inventors: Mutsumi Katayama, Saitama (JP); Kazumitsu Kushida, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 615 days.

(21) Appl. No.: 10/667,157

(22) Filed: Sep. 19, 2003

(65) Prior Publication Data

US 2004/0097263 A1   May 20, 2004

(30) Foreign Application Priority Data

Sep. 20, 2002  (JP) .............................. 2002-275651

(51) Int. Cl.
*H04B 7/15* (2006.01)
(52) U.S. Cl. .................. 455/11.1; 455/42.1; 455/556.1; 455/569.2
(58) Field of Classification Search ............... 455/11.1, 455/42.1, 556.1, 569.2, 575.2, 575.9, 41.2
See application file for complete search history.

(56) References Cited

U.S. PATENT DOCUMENTS 6,831,896 B1 * 12/2004 Lempio et al. .............. 370/252
2003/0092384 A1 * 5/2003 Ross, III ....................... 455/41
2003/0235179 A1 * 12/2003 Tuomela et al. .............. 370/347
2005/0180343 A1 * 8/2005 Van Valkenburg ........... 370/310
2006/0129679 A1 * 6/2006 Hlasny ........................ 709/227

* cited by examiner

*Primary Examiner*—Nay Maung
*Assistant Examiner*—Tuan H Nguyen
(74) *Attorney, Agent, or Firm*—Carrier, Blackman & Associates, P.C.; William D. Blackman; Joseph P. Carrier (57) ABSTRACT

A wireless network system for enabling good communications, while minimizing the electricity consumption of a portable terminal, is described. Included are: a first relay device *4a* including first and second Bluetooth® (BT) modules ① and ②. Each of the BT modules performs a cable communication irrespective of which is a master/slave. The system also includes a second relay device *4b* including a fourth BT module ④; a wireless terminal 3 including a third BT module ③; and a wireless terminal 3 including a fifth BT module. The first and third BT modules structure a first piconet in which the first BT model ① is a master and the third BT module ③ is a slave, and the second, fourth, and fifth BT modules structure a second Piconet in which the fourth BT module ④ is a master, and the second and fifth BT modules ② and ⑤ are slaves.

24 Claims, 6 Drawing Sheets

WIRELESS NETWORK SYSTEM AND COMMUNICATIONS METHOD

CROSS-REFERENCE TO RELATED APPLICATIONS

The present application claims priority under 35 U.S.C. 119, based on Japanese patent application No. 2002-275651, filed Sep. 20, 2002.

BACKGROUND OF THE INVENTION

1. Field of the Invention

The present invention relates to a wireless network system, and a wireless communications method using the described network. More particularly, the present invention relates to a wireless network system and a wireless communications method suitable for a vehicle intercom performing short-range communications, utilizing an ISM (Industry Science Medical) band.

2. Description of the Relevant Art

BLUETOOTH® is a registered trademark of the Bluetooth Special Interest Group (Bluetooth SIG), an industry consortium dedicated to setting standards for wireless radio communication. The Bluetooth SIG has published a specification relating to short distance radio communication between electronic devices, in the 2.4 GHz band. The Bluetooth® specification is accessible via www.bluetooth.com, and the disclosure of the Bluetooth® specification is incorporated herein by reference. More information about Bluetooth® can be found at www.bluetooth.com. As used herein, the term "Bluetooth®", when used in relation to an electronic device, is intended to mean that the device functions in compliance with the Bluetooth® specification.

For allowing two-wheel vehicle occupants to talk to each other, it has been known to provide each of the occupants helmets with a headset, including a speaker, a microphone, and a portable wireless terminal. Such a communications system (intercom) is exemplarily disclosed in JP-UM-A-62-155535.

Similarly, JP-A-2001-148657 discloses a wireless terminal mounted on the side of a vehicle, for relaying conversations made by occupants on the same or different vehicle(s) using headsets. In the technology discussed in JP-A-2001-148657, the Bluetooth® specification is adopted as a wireless communications standard for intercoms.

Although the known devices have some utility for their intended purposes, a need still exists in the art for an improved wireless network system and wireless communications method for use in connection with vehicles. In particular, there is a need for an improved ability for wireless communication between vehicle occupants.

SUMMARY OF THE INVENTION

The present invention provides an apparatus for use in wireless communications. Bluetooth® is one of the short-range wireless communications standard utilizing an ISM band of 2.4 GHz, and is used mainly for establishing connection between a personal computer and peripheral equipment such as a printer, a modem, or a keyboard, or between a mobile phone and a personal computer. Using Bluetooth® eliminates the need for a cable for device connection, thereby considerably improving the device usability. Bluetooth® is classified into three classes in terms of transmission output. Specifically, class 1 is 100 milliwatts at the maximum (maximum transmission distance 100 m), class 2 is 2.5 milliwatts at the maximum, and class 3 is 1 milliwatt at the maximum (maximum transmission distance 10 m).

Devices compatible with the Bluetooth® specification can be characterized as either a master, determining a frequency hopping pattern, or as a slave, following the pattern set by the master. Seven slaves, at the maximum, can be grouped together with a master. Such a master and slaves structure a wireless network, which is called a piconet. A master in one piconet can be a slave in another piconet at the same time. Utilizing such a feature, a technology has been proposed to connect multiple piconets together in a string, to construct a wireless network system much larger in size. The resulting network is called a scatternet, which is yet in the design phase.

Next, referring to FIGS. 6 and 7, four occupants on two vehicles A and B will be discussed, in relation to their communications with one another using an intercom.

A helmet, for an occupant to wear, is provided with a microphone 1, a speaker 2, and a portable wireless terminal 3, of radio frequency type. A relay device 4 is mounted on each of first and second vehicles A and B, respectively, for enabling wireless communications between the portable wireless terminals 3.

The portable wireless terminal 3 is of a battery-operated type, while the relay device 4 receives electricity from a storage battery 5, which is mounted on the vehicle.

Figure 6:
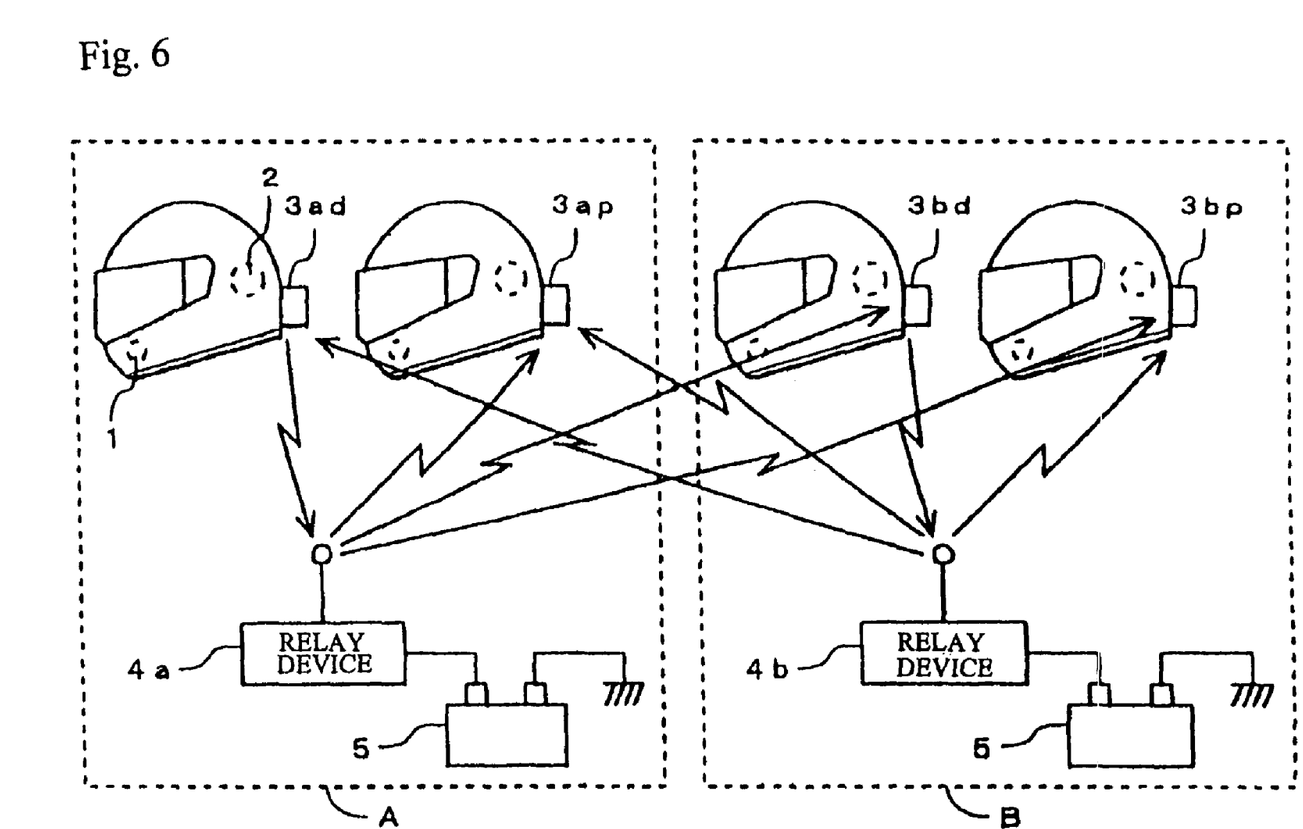
FIG. 6 is a diagram showing a first arrangement of a voice intercom communications system for two vehicles.

In such a system structure, for the occupants on the same vehicle, i.e., driver and passenger, to communicate with each other, in a first arrangement shown in FIG. 6, the driver's voice is detected by the microphone 1, converted into an audio signal, and then transferred to the portable wireless terminal 3 over a helmet-mounted cable. A driver's terminal 3ad communicates with a passenger's terminal 3ap via a relay device 4a, provided on the same vehicle.

Furthermore, in the arrangement of FIG. 6, when the occupants on different vehicles wish to communicate with each other, for example, a radio wave, sent out from the driver's terminal 3ad of the first vehicle A, is initially received by the relay device 4a of the same vehicle. Then, the radio wave is relayed and is sent out again. The radio wave sent out from the relay device 4a is received by the passenger's terminal 3ap on the first vehicle A, and received simultaneously by a driver's terminal 3bd and a passenger's terminal 3bp both belonging to the second vehicle B.

Another radio wave, sent out from the driver's terminal 3bd of the second vehicle B, is received by the relay device 4b of the same vehicle, is amplified therein and sent out again. The radio wave sent out from the relay device 4b is received by the passenger's terminal 3bp on the second vehicle B, and is received simultaneously by the driver's terminal 3ad and the passenger's terminal 3ap of the first vehicle A.

Figure 7:
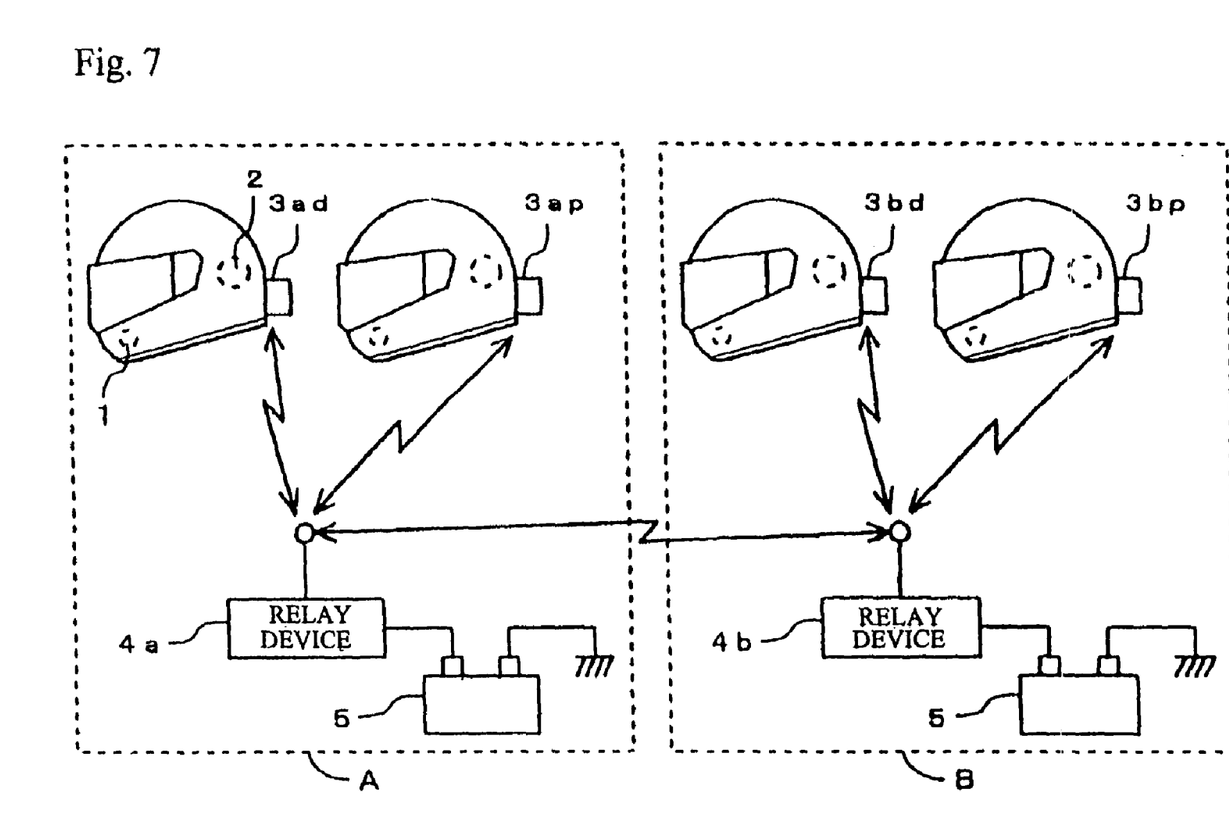
FIG. 7 is a diagram showing a second, alternative arrangement using the voice intercom communications system.

In a second arrangement of the components, as shown in FIG. 7, the occupants on the same vehicle communicate in the same manner as in the above first arrangement, but the occupants on the first vehicle A and the occupants on the second vehicle B communicate only via the respective relay devices 4a and 4b. This is different from the above first arrangement, as will be made clear by a comparison of FIG. 6 with FIG. 7.

When attaching a portable wireless terminal 3 to an occupant's helmet, if power is to be supplied from the corresponding vehicle, appropriate power supply wiring is needed to provide a hard-wired connection between the first vehicle and the occupant's helmet, which is inconvenient. In order to avoid the need for such power supply wiring, it is possible to provide power from a small portable battery inside of the wireless terminal 3. With this structure, however, a technology for minimizing electricity consumption by the wireless terminal 3 is needed, to enable longer battery operation for the small portable battery therein.

For a Bluetooth® piconet, a power-saving mode called "Sniff Mode" is available. Within a piconet, slaves are allowed to shift into sniff mode, but a master device is not allowed to so shift. Therefore, whichever terminal is operating as master tends to consume battery power faster than the other terminals, operating as slaves.

Once the master becomes inoperable due to weak battery, slaves in the same piconet also become inoperable, no matter how fresh their batteries are. In view thereof, in the intercom described in the above, it is preferable that the relay device 4, receiving power from the vehicle-mounted storage battery 5 be designated as the master, and the battery-operated helmet-mounted terminals 3, with more limited power resources, be designated as slaves.

Further, in the first communications arrangement shown in FIG. 6, when the occupants on the vehicles A and B want to talk to each other, a wireless terminal 3 attached to one occupant's helmet has to communicate with a relay device mounted on the other vehicle. This may become difficult if the vehicle-to-vehicle distance exceeds 10 meters, and thus requires the transmission electricity of class 1 (high power). This resultantly increases electricity consumption, whereby there is no choice but to include a battery of larger capacity.

On the other hand, in the second communications arrangement of FIG. 7, the wireless terminals 3, each attached to the occupants' helmets, only need to communicate with the relay device 4 on the corresponding vehicle. Accordingly, transmission electricity of about class 2 or 3 (middle to low power) may be enough therefor. As such, this permits the use of a smaller battery size in the terminal 3, and extends battery life as compared to the arrangement of FIG. 6.

A concern here is that, in the second communications arrangement of FIG. 7, three different piconets are created. A first piconet has to be structured containing the relay device 4a and the wireless terminals 3ad and 3ap, in the first vehicle A. A second piconet has to be structured containing the relay device 4a in the first vehicle A and the relay device 4b in the second vehicle B, and a third piconet has to be structured containing the relay device 4b and the wireless terminals 3bd and 3bp in the second vehicle B.

The problem is that, in the network structured as above, e.g., if the relay device 4a in the first vehicle A is designated as a master, then the relay device 4b of the second vehicle B will become a slave. This may result in either the portable wireless terminal 3bd or 3bp being a master. Thus, it is difficult to minimize the consumption of electricity.

Herein, structuring a scatternet by those three piconets may be a possibility, to allow the terminals 3 and 4 to operate with either one acting as master or slave. However, the scatternet has not yet been completely defined by specifications, and still requires development time before it will be available for practical use. Even if the scatternet is currently constructable, one Bluetooth® module allows only, at maximum, three SCO (Synchronous Connection Oriented) links to be established therein for audio communications, thereby imposing added limitations.

An object of the present invention is to solve the conventional problems described above, and without adopting the described scatternet, to provide a wireless network system and a wireless communications method enabling good communications, while minimizing the electricity consumption of a portable terminal.

In order to achieve the above object, a wireless network system including a plurality of Bluetooth® terminals, according to an illustrative embodiment of the present invention is provided. The system, according to the first embodiment, includes a first relay device including first and second Bluetooth® modules. Each of the Bluetooth® modules performs cable communications irrespective of which is a master/slave. The system hereof also includes at least one first wireless terminal including a third Bluetooth® module; a second relay device including a fourth Bluetooth® module; and at least one second wireless terminal including a fifth Bluetooth® module.

In the use of the system hereof, characteristically, the first and third Bluetooth® modules structure a first Piconet in which the first Bluetooth® module is a master and the third Bluetooth® module is a slave. The second, fourth, and fifth Bluetooth® modules structure a second Piconet in which the fourth Bluetooth® module is a master, and the second and fifth Bluetooth® modules are slaves.

With the characteristics described above, the first relay device structures the first Piconet with the first wireless terminal using the first Bluetooth® module belonging thereto, and using the second Bluetooth® module, structures the second Piconet with the second relay device and the second wireless terminal. With such a structure, without adopting a scatternet, the first relay device can operate as both a master and a slave. Further, as for the transmission electricity class, class 3 (low power) is adopted to the first Piconet, and class 1 (high power) is adopted to the second Piconet. As such, the relay devices can achieve long-distance communications therebetween, and the wireless terminals can minimize power consumption therein.

Accordingly, it is an object of the present invention to provide a method and apparatus for facilitating wireless communications.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

In the following description, a number of presently preferred embodiments of the present invention are described in detail by referring to accompanying drawings. In the present embodiment, as in the second arrangement described by referring to FIG. 7, a communications arrangement is adopted in which occupants on different vehicles talk to each other exclusively via the relay devices 4, on the corresponding vehicles, and occupants on the same vehicle talk to each other via the relay device 4 on their own vehicle.

Figure 1:
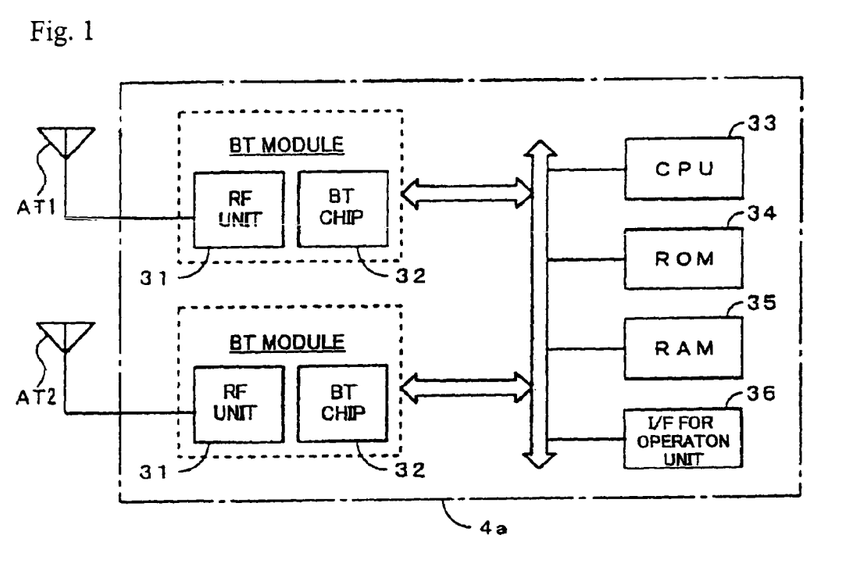
FIG. 1 is a block diagram showing, in a wireless network system to which the present invention is applied, the structure of a relay device to be mounted on a first vehicle, in a communications system according to a first illustrative embodiment of the invention.

FIG. 1 is a block diagram, showing the structure of a relay device 4a to be mounted on a first vehicle A (FIG. 7), in a wireless network communications system according to a first embodiment of the present invention.

Figure 2:
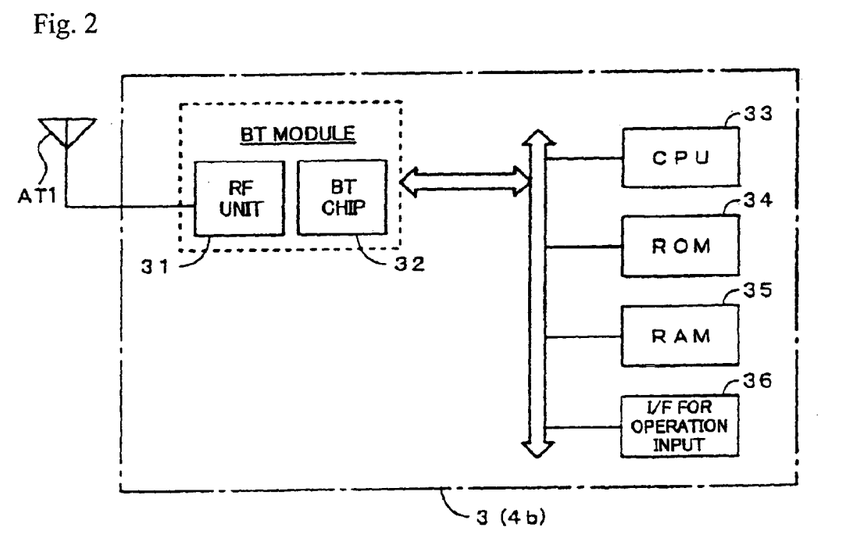
FIG. 2 is a block diagram showing, in the wireless network system to which the present invention is applied, the structure of a portable wireless terminal for an occupant, and also illustrating the structure of a relay device to be mounted on a second vehicle, in the communications system according to the first embodiment hereof.

FIG. 2 is a block diagram showing a structure which represents the internal structure of each of the portable wireless terminals 3 (3ad, 3ap, 3bd, and 3bp) to be attached to occupants' helmets, respectively. The structure shown in FIG. 2 also represents that of the relay device 4b to be mounted on the second vehicle B. Herein, only structures considered necessary for clarifying the present invention are described. Other conventional structures, and those of ancillary and auxiliary components of the system, are assumed to be known and understood by those skilled in the art.

In the embodiment shown in FIG. 1, the relay device 4a, mounted on the first vehicle A, includes two BT modules. The Bluetooth® (hereafter denoted by BT) modules are characterized in being connected together over a cable via a bus, and perform communications with each other irrespective of which is a master or a slave. The BT modules are provided with antennas AT1 and AT2, respectively. The portable wireless terminals 3, attached to the occupants' helmets, and the relay device 4b, to be mounted on the second vehicle B, are different from the relay device 4a mounted on the first vehicle A in that in these devices, as shown in FIG. 2, the BT module and the corresponding antenna AT are each singularly provided.

A CPU 33 executes various processes in accordance with a program stored in ROM 34. In the relay device 4a in FIG. 1, one CPU 33 controls two BT modules. RAM 35 provides a work area for the CPU 33 to temporarily store data or the like, for example, at the time of executing various processes. Various operation switches and a display device are connected to an input/output interface 36. The two BT modules, the CPU 33, the ROM 34, the RAM 35, and the interface 36 are all connected to one another via a common bus.

The BT modules are each structured mainly by an RF unit 31, and a BT chip 32. The BT chip 32 executes a process of establishing inter-piconet synchronization with another terminal, a process of encoding/decoding transmission/reception signals, and the like. In detail, each of the BT modules subjects a carrier signal to digital modulation using transmission data at the time of transmission, and the resulting modulated carrier signal is subjected to spread-spectrum utilizing frequency hopping.

Then, after amplifying the transmission signal to be a transmission output level of a predetermined value or lower, the result is transmitted toward another wireless terminal from the antenna AT. Also, a radio signal coming from the wireless terminal belonging to the person who is currently communicating with is received via the antenna AT for subjecting the same to inverse-spread-spectrum, and then to digital demodulation.

First Embodiment

Figure 3:
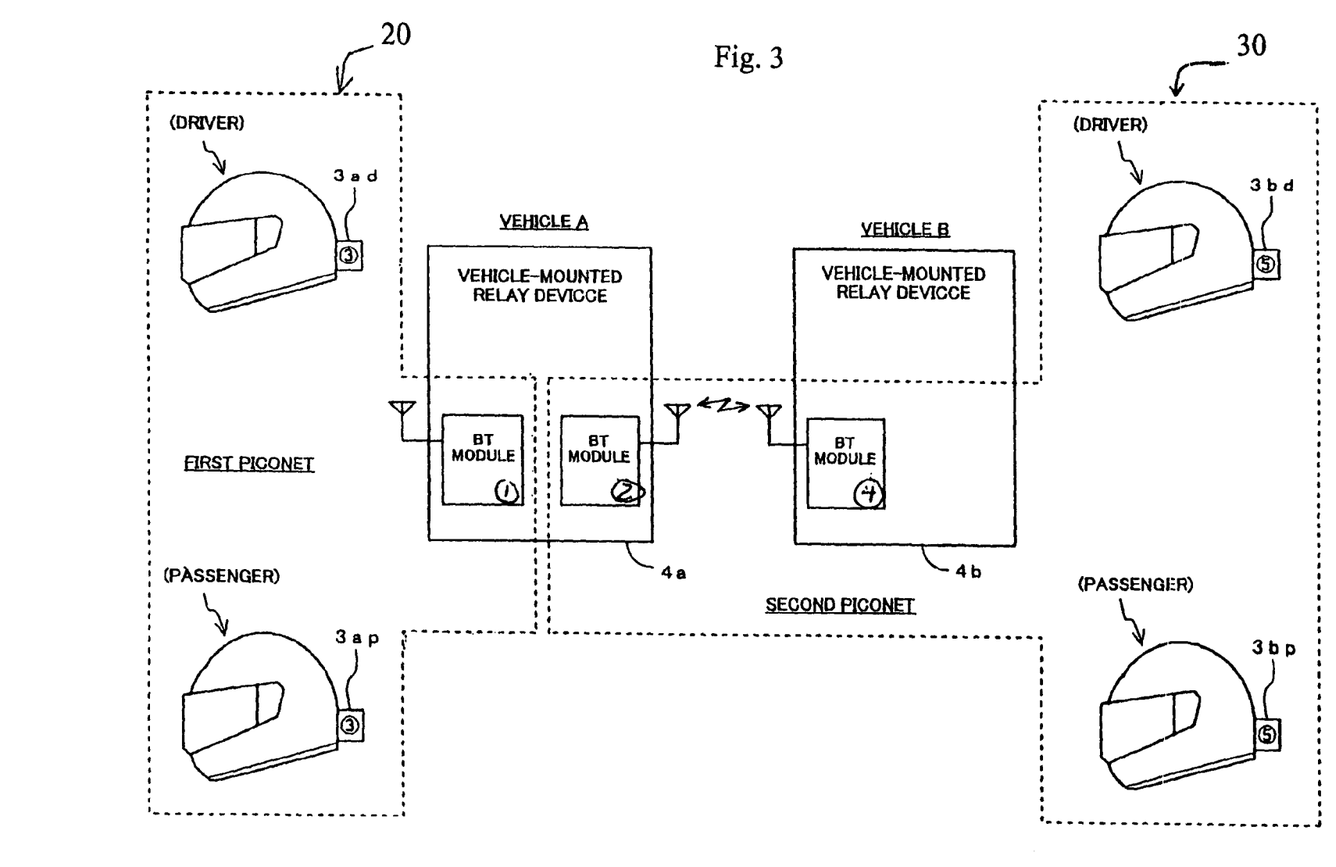
FIG. 3 is a diagram schematically showing the structure of a wireless network according to the first embodiment of the present invention.

FIG. 3 is a diagram schematically showing the structure of the first embodiment of the wireless network system according to the present invention. Therein, a first BT module ①, incorporated in the relay device 4a mounted on the first vehicle A, and two BT modules ③ of the portable wireless terminals 3ad and 3ap, structure a first piconet 20. The modules ③ are each attached to the occupants' helmets on the first vehicle A.

In this first piconet 20, the first BT module ① operates as a master, and the third BT modules ③ operate as slaves. The transmission electricity selected therein is low powered electricity of level 3.

Also in the embodiment of FIG. 3, a second BT module ②, incorporated in the relay device 4a mounted on the first vehicle A, a fourth BT module ④, incorporated in the wireless terminal 4b of the second vehicle B, and fifth BT modules ⑤ of the portable wireless terminals 3bd and 3bp structure a second piconet 30. The fifth BT modules ⑤ are attached, respectively, to the occupants' helmets on the second vehicle B.

In this second piconet, the fourth BT module ④ operates as a master, and the second and fifth BT modules ② and ⑤ operate as slaves. The transmission electricity selected therein is high powered electricity of level 1. Note herein that, utilizing an output control function of the fifth BT modules ⑤, the transmission output is limited to be about class 2, achieving efficient power conservation.

As such, according to the present embodiment, without adopting a scatternet, the relay devices 4a and 4b to be mounted on each first vehicle Are made operate as masters with respect to the respective portable wireless terminals 3, attached to the occupants on the corresponding vehicle. Thanks thereto, while minimizing the electricity consumption of the portable wireless terminals 3, the occupants can enjoy conversation whether they are on the same vehicle or on separate vehicles.

Second Embodiment

Figure 4:
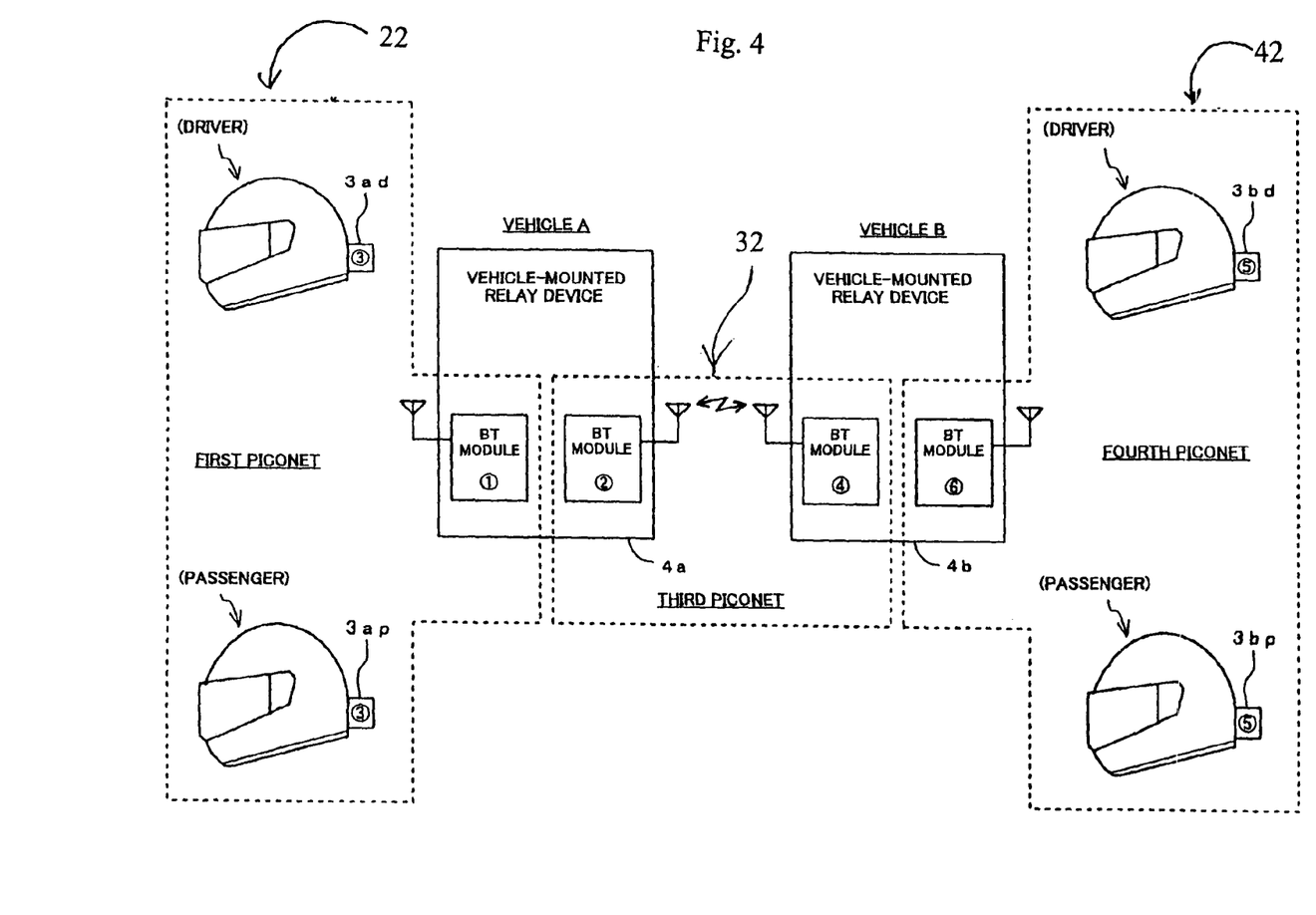
FIG. 4 is a diagram schematically showing the structure of a wireless network according to a second illustrative embodiment of the invention.

FIG. 4 is a diagram schematically showing the structure of a second embodiment of the wireless network system to which the present invention is applied. Herein, not only the relay device 4a mounted on the first vehicle A, the relay device 4b mounted on the second vehicle B is also including two BT modules ④ and ⑥.

In this second piconet, the fourth BT module {circle over (4)}operates as a master, and the second and fifth BT modules {circle over (2)}and {circle over (5)}operate as slaves. The transmission electricity selected therein is high powered electricity of level 1. Note herein that, utilizing an output control function of the fifth BT modules {circle over (5)}, the transmission output is limited to be about class 2, achieving efficient power conservation.

In the present embodiment, the second BT module ② incorporated in the relay device 4a mounted on the first vehicle A, and the fourth BT module ④ incorporated in the wireless terminal 4b of the second vehicle B structure a third Piconet 32. In this third Piconet 32, the fourth BT module ④ operates as a master, and the second BT module operates as a slave. The transmission electricity selected therein is high powered electricity of level 1.

Further, in the present embodiment, the sixth BT module ⑥ incorporated in the relay device 4b mounted on the second vehicle B, and the fifth BT modules ⑤ of the portable wireless terminals 3bd and 3bp each attached to the occupants' helmets on the second vehicle B structure a fourth Piconet 42. In this fourth Piconet 42, the sixth BT module ⑥ operates as a master, and the fifth BT modules ⑤ operate as slaves. The transmission electricity selected therein is low powered electricity of level 3.

As such, according to the present embodiment, without adopting a scatternet, the relay devices 4a and 4b, to be mounted on each first vehicle, are made operate as a master with respect to the portable wireless terminals 3 attached to the occupants on the corresponding vehicle. Thanks thereto, while minimizing the electricity consumption of the portable wireless terminals 3, the occupants can enjoy conversation, no matter whether they are on the same vehicle or not.

Further, according to the present embodiment, the portable wireless terminals 3bd and 3bp of the second vehicle B can select the transmission electricity of class 3. Therefore, the electricity consumption thereof can be minimized to a greater degree, and battery power of the portable helmet-mounted terminals can be conserved.

Third Embodiment

Figure 5:
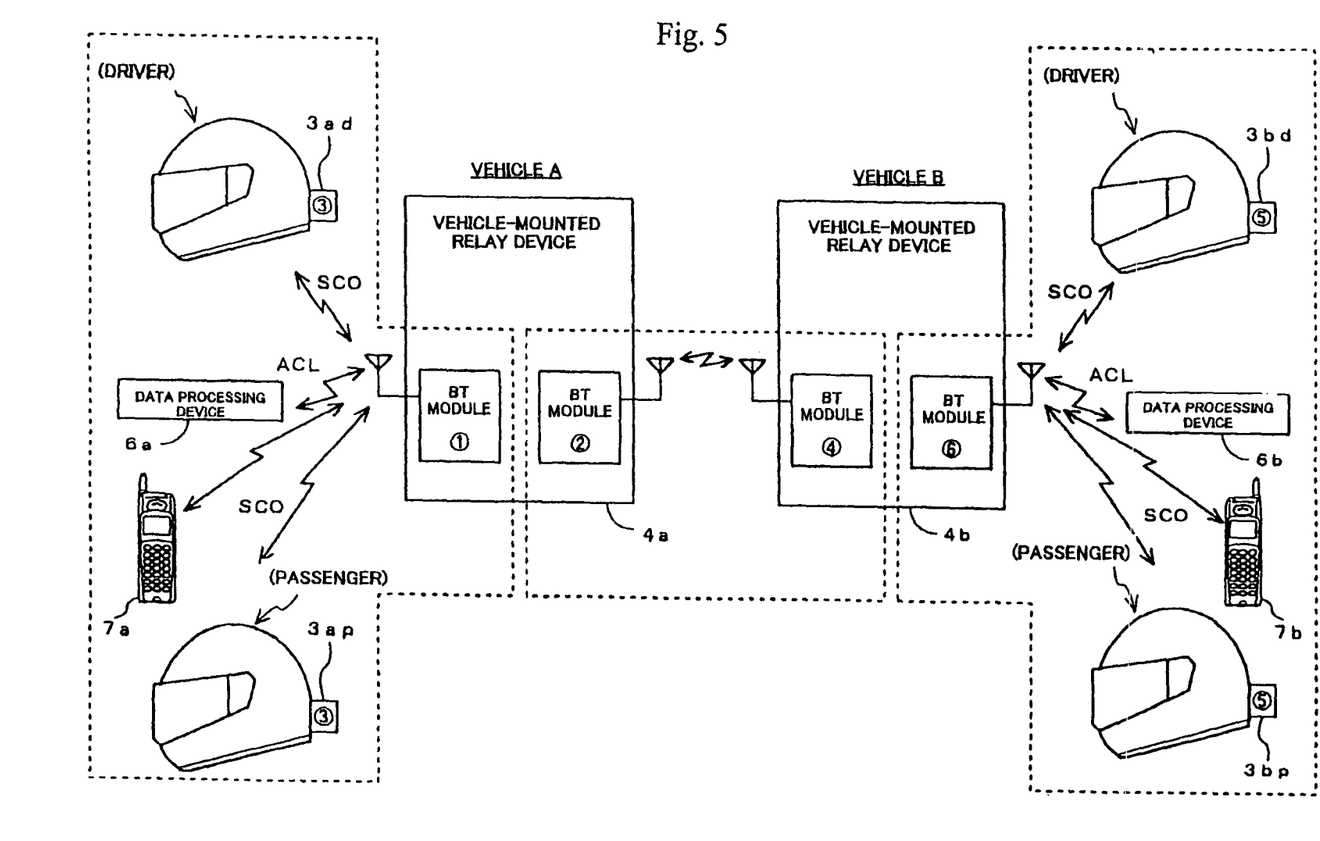
FIG. 5 is a diagram schematically showing the structure of a wireless network, according to a third illustrative embodiment of the invention.

In the above embodiments, exemplified is a case where the portable terminals 3 are intercom handsets, and an SCO link of a circuit switching type (mainly for audio signal) is established between the terminals. The present invention is not restricted to the communications systems of the first two embodiments. Not only the vehicle occupants' conversation, but also information on the vehicle condition can be simultaneously exchanged, as shown in FIG. 5, together with or instead of the portable terminals 3. Data processing devices 6a and 6b can be provided for detecting the vehicle running condition, and/or to establish an ACL link. Still further, if the occupants are carrying mobile phones 7a and 7b, incoming and outgoing calls can be made via the relay devices 4a and 4b.

According to an embodiment of the present invention, the following effects can be successfully achieved.

Without adopting a scatternet, a relay device mounted on each vehicle can operate as a master with respect to a portable wireless terminal attached to the occupant on the vehicle. Accordingly, while minimizing the electricity consumption of the portable wireless terminal, the occupants can enjoy conversation no matter if they are on the same vehicle or not.

A relay device is provided with two BT modules. One of them structures a first piconet with another relay device, and the other structures a second piconet with a portable terminal. Therefore, the relay device applies the transmission electricity level of level 1 to the first piconet, and level 2 or 3 can be applied to the second piconet. This successfully allows the first piconet to be wider, and the battery life of the battery in the portable terminal to be extended.

Although the invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be with the scope and spirit of the present invention.

What is claimed is:

1. A wireless network system for use with two vehicles, said system comprising:
    a first relay device including first and second Bluetooth® modules, each of the first and second Bluetooth® modules capable of performing a cable communication irrespective of which is a master or slave, wherein said relay device is configured to be mounted to a first vehicle of said two vehicles; and
    at least one first wireless terminal including a third Bluetooth® module,
    wherein the first and third Bluetooth® modules structure a first piconet in which the first Bluetooth® module is a master, and the third Bluetooth® module is a slave,
    the second Bluetooth® module structures a second piconet;
    and wherein the first piconet and the second piconet structure a network,
    a second relay device including a fourth Bluetooth® module, wherein said second relay is configured to be mounted to a second vehicle of said two vehicles; and
    at least one second wireless terminal including a fifth Bluetooth® module,
    wherein the second, fourth, and fifth Bluetooth® modules structure a second piconet in which the fourth Bluetooth® module is a master, and the second and fifth Bluetooth® modules are slaves.

2. The wireless network system according to claim 1, wherein the second, fourth, and fifth Bluetooth® modules communicate with one another with transmission electricity conforming to a class 1 of a Bluetooth® standard.

3. The wireless network system according to claim 2, wherein the fifth Bluetooth® module includes means for restricting transmission electricity.

4. The wireless network system according to claim 1, comprising:
    a second relay device including fourth and sixth Bluetooth® modules, each of the fourth and sixth Bluetooth® modules capable of performing a cable communication irrespective of which is a master or slave, wherein said second relay device is configured to be mounted to a second vehicle of said two vehicles;
    at least one second wireless terminal including a fifth Bluetooth® module;
    the second and fourth Bluetooth® modules structure a third piconet in which the fourth Bluetooth® module is a master, and the second Bluetooth® module is a slave;
    wherein the fifth and sixth Bluetooth® modules structure a third piconet in which the sixth Bluetooth® module is the master, and the fifth Bluetooth® module is the slave; and
    wherein the first, second, and third piconets structure a network.

5. The wireless network system according to claim 4, wherein the second and fourth Bluetooth® modules communicate with each other with transmission electricity conforming to a class 1 of a Bluetooth® standard.

6. The wireless network system according to claim 4, wherein the fifth and sixth Bluetooth® modules communicate with each other with transmission electricity conforming to a class 2 or 3 of a Bluetooth® standard.

7. The wireless network system according to claim 4, wherein, in the second relay device, the fourth and sixth Bluetooth® modules are controlled by common control means.

8. The wireless network system according to claim 7, wherein the fourth and sixth Bluetooth® modules and the control means are connected together via a bus.

9. The wireless network system according to claim 1, wherein the first and third Bluetooth® modules communicate with each other with transmission electricity conforming to a class 2 or 3 of a Bluetooth® standard.

10. The wireless network system according to claim 1, wherein an SCO link or an ACL link is established between the Bluetooth® modules.

11. The wireless network system according to claim 1, wherein, in the first relay device, the first and second Bluetooth® modules are controlled by common control means.

12. The wireless network system according to claim 11, wherein the first and second Bluetooth® modules and the control means are connected together via a bus.

13. A wireless communications method in a wireless network system constructed by a plurality of Bluetooth® terminals for use on two vehicles, wherein the system comprises:
  a first relay device including first and second Bluetooth® modules, each of the Bluetooth® modules performs a cable communication irrespective of which is a master/slave, wherein said first relay device is configured to be mounted to a first vehicle of said two vehicles, and
  a second relay device including a fourth Bluetooth® module, said second relay device being configured to be mounted on a second vehicle of said two vehicles; and
  at least one first wireless terminal including a third Bluetooth® module, and at least one second wireless terminal including a fifth Bluetooth® module, and
  in the method,
  the first and third Bluetooth® modules communicate with each other on a first piconet in which the first Bluetooth® module is a master, and the third Bluetooth® module is a slave,
  the second Bluetooth® module communicates with any one of the other Bluetooth® modules on a second piconet, and
  the second, fourth, and fifth Bluetooth® modules communicate with one another on a second piconet in which the fourth Bluetooth® module is a master, and the second and fifth Bluetooth® modules are a slaves, and
  the first piconet and the second piconet structure a network.

14. The wireless communications method in a wireless network system according to claim 13, wherein the second, fourth, and fifth Bluetooth® modules communicate with one another with transmission electricity conforming to a class 1 of a Bluetooth® standard.

15. The wireless communications method in a wireless network system according to claim 14, wherein the fifth Bluetooth® module restricts transmission electricity.

16. The wireless communications method in a wireless network system according to claim 14, wherein
  the system comprises:
    a second relay device including fourth and sixth Bluetooth® modules, and each of the Bluetooth® modules performs a cable communication irrespective of which is a master/slave, wherein said second relay device is configured to be mounted on a second vehicle; and
    at least one second wireless terminal including a fifth Bluetooth® module, and
  in the method,
    the second and fourth Bluetooth® modules communicate with one another on a third Piconet in which the fourth Bluetooth® module is a master, and the second Bluetooth® module is a slave,
    the fifth and sixth Bluetooth® modules communicate with each other on a third piconet in which the sixth Bluetooth® module is the master, and the fifth Bluetooth® module is the slave, and
    the first, second, and third piconets structure a network.

17. The wireless communications method in a wireless network system according to claim 16, wherein the second and fourth Bluetooth® modules communicate with each other with transmission electricity conforming to a class 1 of a Bluetooth® standard.

18. The wireless communications method in a wireless network system according to claim 16, wherein the fifth and sixth Bluetooth® modules communicate with each other with transmission electricity conforming to a class 2 or 3 of a Bluetooth® standard.

19. The wireless communications method in a wireless network system according to claim 16, wherein, in the second relay device, the fourth and sixth Bluetooth® modules are controlled by common control means.

20. The wireless communications method in a wireless network system according to claim 19, wherein the fourth and sixth Bluetooth® modules and the control means are connected together via a bus.

21. The wireless communications method in a wireless network system according to claim 13, wherein the first and third Bluetooth® modules communicate with each other with transmission electricity conforming to a class 2 or 3 of a Bluetooth® standard.

22. The wireless communications method in a wireless network system according to claim 13, wherein an SCO link or an ACL link is established between the Bluetooth® modules.

23. The wireless communications method in a wireless network system according to claim 13, wherein, in the first relay device, the first and second Bluetooth® modules are controlled by common control means.

24. The wireless communications method in a wireless network system according to claim 23, wherein the first and second Bluetooth® modules and the control means are connected together via a bus.

* * * * *